United States Patent [19]

Columbus

[11] 4,251,400

[45] Feb. 17, 1981

[54] HOT AND COLD WATER REDISPERSIBLE POLYVINYL ACETATE ADHESIVES

[75] Inventor: Peter S. Columbus, Queens, N.Y.

[73] Assignee: Borden, Inc., Columbus, Ohio

[21] Appl. No.: 74,005

[22] Filed: Sep. 10, 1979

Related U.S. Application Data

[63] Continuation of Ser. No. 699,530, Jun. 24, 1976, abandoned, which is a continuation of Ser. No. 195,499, Nov. 3, 1971, abandoned.

[51] Int. Cl.$^3$ .................... C08L 29/04; C08L 39/06; C08L 89/04; C08L 89/06
[52] U.S. Cl. .................................... 260/8; 260/17 R; 260/17.4 ST; 260/29.6 RB; 260/29.6 RW; 428/511; 428/518
[58] Field of Search ............. 260/29.6 RB, 29.6 RW, 260/8, 17 R, 17.4 ST

[56] References Cited

U.S. PATENT DOCUMENTS

| | | | |
|---|---|---|---|
| 3,082,183 | 3/1963 | Boyd | 260/29.6 NR |
| 3,442,845 | 5/1969 | Columbus | 260/8 X |
| 3,574,153 | 4/1971 | Sirota et al. | 260/8 |

OTHER PUBLICATIONS

Handbook of Antara Chemicals (General Aniline), 1962, pp. 1 & 16.
Adhesives Age, Jun. 1969, pp. 40-41, Ross et al.

*Primary Examiner*—Howard E. Schain
*Attorney, Agent, or Firm*—George P. Maskas; Daniel D. Mast; Kenneth P. Van Wyck

[57] ABSTRACT

This invention relates to polyvinyl acetate adhesives redispersible in hot and cold water in the dried film form. The adhesives comprise an emulsion of a polyvinyl acetate, an anti-coalescing polyvinylpyrrolidone and a non-volatile, water-soluble plasticizer for said anti-coalescing agent that is immiscible with the polyvinyl acetate resin, said plasticizer being present in amount to impart flexibility to the dried adhesive film and the ratio of polyvinyl acetate to anti-coalescing agent not exceeding about 8 parts by weight for each part by weight of agent.

9 Claims, No Drawings

HOT AND COLD WATER REDISPERSIBLE POLYVINYL ACETATE ADHESIVES

This is a continuation of application Ser. No. 699,530, filed June 24, 1976, now abandoned, which in turn is a continuation of application Ser. No. 195,499, filed Nov. 3, 1971, abandoned.

BACKGROUND OF THE INVENTION

This invention relates to polyvinyl acetate emulsion adhesives and in particular to such adhesive that are readily redispersible in both hot and cold water when dried in film form.

Polyvinyl acetate emulsions are commonly used in making multi-purpose adhesives; that is, adhesives which can be used to adhere such substrates as wood, paper, cloth, plastic and the like. Because such polyvinyl acetate has a glass transition temperature (Tg) at about room temperature, the acetate particles will coalesce to form a water resistant dry film at ambient temperature. This coalescence is made more extensive by the water-immiscible plasticizers for the acetate that are used in order to impart flexibility to the dry film. When such adhesive dries on a surface from which it is desired to remote it, it cannot be readily washed off with water or with water and soap solutions. In fact, if hot water is used, the polyvinyl acetate coalesces irreversibly to form an even more water-resistant film. Consequently, solvents for polyvinyl acetate are employed for the purpose of removal of the film.

For many uses, washability of such polyvinyl acetate adhesives in water is desired, particularly because of the fact that in their use, as by young children, the adhesives are often inadvertently deposited on clothing, tablecloths, carpets and other surfaces. Since solvents must be used, the surface from which the film is to be removed is often damaged or discolored by the solvent. Furthermore, the use of a solvent brings with it the hazards of fire and toxicity. It has long been desired to retain the excellent all-purpose adhesive properties of polyvinyl acetate adhesives, while at the same time eliminating the need for solvent to remove the film from surfaces onto which the film is deposited.

U.S. Pat. No. 3,442,845 of Columbus, et al, teaches a composition that imparts the needed redispersibility to the dried adhesive film in cold or hot water without affecting the general purpose adhesive properties of the polyvinyl acetate adhesive.

While the composition of the Columbus, et al, patent provides good adhesion to most substrates and has good water redispersibility, it lacks good adhesion to many plastics. As the water redispersible adhesives are used widely by small children who work with plastic film and plastic substrates in arts and crafts work, it is important that the adhesive they use adhere well to plastics. Being able to make things with plastics gives a child a sense of accomplishment. If the adhesive fails, it results in frustration to the child.

SUMMARY OF THE INVENTION

Briefly stated, the present invention comprises an aqueous emulsion of a polyvinyl acetate, an anti-coalescing agent consisting essentially of polyvinylpyrrolidone in an amount sufficient to prevent irreversible coalescence of the polyvinyl acetate, and non-volatile, water-soluble plasticizer for the anti-coalescing agent that is immiscible with the polyvinyl acetate. Polyvinyl pyrrolidone is sometime in this specification referred to as "PVP."

The composition of the present invention has improved redispersibility in both hot and cold water and washes out more easily (in less time) than do the compositions taught by the Columbus, et al, patent. In addition, the composition of the present invention has superior adhesion to plastics as compared to the compositions of the Columbus, et al, patent. Children can more easily adhere plastics to substrates with a more permanent bond using the composition of the present invention than they could using similar type prior art adhesives.

DESCRIPTION OF THE PREFERRED EMBODIMENT

The polyvinyl acetate used is preferably one having a weight average molecular weight ranging from about 30,000 to 60,000, although higher and lower molecular weight resins can be used. In commercial practice, it is preferred to use polyvinyl acetate emulsions that are homopolymer dispersions of a total solids content on the order of about 55%. The particle size of the dispersed acetate particles is important in that the larger the particle, the less tendency there is for the particles to coalesce. It is preferred, therefore, to have the majority of the particles ranging from about 1 to about 3 microns in diameter, and the remainder at least as large.

The polyvinyl acetate emulsions which are commercially available generally contain small amounts of polyvinyl alcohol as an anti-coalescing agent. The amount present generally ranges from about 2% to about 6%, based upon the total weight of the emulsion. It is immaterial for the purposes of this application whether the polyvinyl acetate contains the usual amounts of polyvinyl alcohol or none at all. When polyvinyl alcohol is referred to in this specification, it includes the commercial grades which contain small amounts of polyvinyl alcohol.

The polyvinylpyrrolidone anti-coalescing agent used is a water-soluble material and compatible with polyvinyl acetate in aqueous dispersions and has a K value of from about 26 to 100. This corresponds to a weight average molecular weight of from about 40,000 to about 360,000. The K-values assigned to various grades of PVP represent a function of the average molecular weight. They are derived from viscosity measurements and are calculated according to Fikentscher's formula:

$$\frac{\log n^{rel}}{c} = \frac{75K_o 2}{1 + 1.5K_o c} + K_o$$

where
 c = concentration in g/100 ml solution
 $n$rel = viscosity of the solution compared with solvent
 K = 1000$K_o$ The PVP used is most preferably relatively pure. The PVP can be replaced in part by other anti-coalescing agents such as those disclosed in U.S. Pat. No. 3,442,845 of Columbus. These include polyvinyl alcohols, water soluble cellulose ethers, gums, gelatinized starches, water soluble grades of gelatin and mixtures thereof. It is preferable that the mixture contain at least 50% PVP but it can contain as low as 20% PVP.

As to the plasticizer, it is necessary that it be non-volatile, water soluble, and immiscible with the polyvinyl acetate, while at the same time plasticizing the anticoalescing agent. It is preferred to use glycerol, although other plasticizers such as sorbitol, ethylene glycol, propylene glycol, diethylene glycol, pentaerythritol and dipentaerythritol, water soluble-polyether glycols and mixtures thereof can be used. The polyether glycols can be polyethylene glycol, polypropylene glycol, polyethylene-polypropylene glycol or any of the other well-known polyether glycols.

The proportion of polyvinyl acetate to polyvinylpyrrolidone anti-coalescing agent is critical in that there must be at least an amount of anti-coalescing agent present to prevent irreversible coalescence of the polyvinyl acetate under hot and cold water washing. It has also been found that the amount is not to be more than 8 parts by weight of the acetate for each part by weight of the anti-coalescing agent. It is preferred to use about 4.5 parts of acetate for each part of the anti-coalescing agent with a ratio of about 2 to 1 as a commercial minimum for suitable washability and adhesive properties. While lower ratios of acetate to agent and even a preponderance of agent can be used the multipurpose adhesive properties are adversely affected.

As a rule, the softening point for the polyvinyl acetate resin varies directly with the molecular weight of the resin dispersed in water. Thus, for optimum results the ratio of acetate to agent is varied within the limits set forth above dependent upon the molecular weight of the polyvinyl acetate and the water resistance of the dry film. Also, polyvinyl acetate resins differ in their degree of cross-linking with increased cross-linking having a comparable effect on softening point as does increased molecular weight. Again, therefore, for optimum results the amount of anti-coalescing agent used is varied within the ratios established, taking cross-linking into account.

To impart the required flexibility to the film for optimum use of the adhesive, it is preferred to use at least about 35% by weight of plasticizer, based on the weight of the polyvinylpyrrolidone, although the proportions of plasticizer used can range up to 100% by weight of polyvinylpyrrolidone used.

In preparing such adhesives, it is preferred to first admix the plasticizer with the polyvinylpyrrolidone and then to add to this solution the dispersion of polyvinyl acetate in water.

In addition to the components noted above, other constituents, such as preservatives, anti-foaming agents, buffers, and pigments, can be added to the emulsion in the usual proportions for their usual effect.

The table set forth below shows the illustrative and preferred proportions of the components of the adhesive as applied for each 100 parts by weight of polyvinyl acetate.

|  | Parts by Weight for 100 Parts Acetate | |
|---|---|---|
|  | Illustrative | Preferred |
| Polyvinyl Acetate | 100 | 100 |
| Polyvinylpyrrolidone | 12–50 | 18–25 |
| Plasticizer | 2–30 | 9–18 |

The invention will be further described in connection with the following examples which are set forth for purposes of illustration.

EXAMPLE I

A polyvinyl acetate adhesive was prepared from the following formulation:

|  | Parts by Weight |
|---|---|
| Polyvinyl Acetate Emulsion (55% total Solids in Water) | 61.05 |
| Polyvinylpyrrolidone (K = 90, MW = 360,000) | 4.88 |
| Glycerol | 2.44 |
| Preservative (o-phenylphenol) | .06 |
| Defoamer (Colloid No. 581) | .33 |
| Water | 31.24 |
|  | 100.00 |

The adhesive was prepared by admixing 30.00 parts of the water at 25° C. with the polyvinylpyrrolidone and defoamer in a jacketed tank equipped with agitators. The preservative, dissolved in 1.24 parts of hot water was added, and the polyvinyl acetate, and remaining water added. The preservative and polyvinyl acetate were added with agitation. While continuing the agitation, the glycerol was added. The emulsion was then filtered and packaged in drums.

When applied to a substrate and allowed to dry, the film formed was readily redispersible with both cold and hot water. The adhesive was used to adhere colored polyvinyl chloride film to paper. The adhesion was good. Other adhesives having the same composition with the exception that the polyvinylpyrrolidone was replaced by other conventional non-coalescing agents were ineffective to providing as strong a bond between the paper and the polyvinyl chloride film.

EXAMPLE II

An adhesive was prepared as set forth in Example 1, except that the parts by weight of the various components were as follows:

|  | Parts by Weight |
|---|---|
| Polyvinyl Acetate | 36.00 |
| *Polyvinyl Alcohol | 1.98 |
| Polyvinylpyrrolidone | 8.5 |
| Glycerol | 2.95 |
| Preservative (o-phenylphenol) | .1 |
| Defoamer (Colloid No. 581) | .2 |
| Water | 50.27 |
|  | 100.00 |

*present as stabilizer in the commercial polyvinyl acetate emulsion used.

The final product was effective in bonding polyvinyl chloride film to paper and was effective on bonding polyvinyl chloride film to polyvinyl chloride film. A dried film of the adhesive was redispersible in both hot and cold water.

EXAMPLE III

An adhesive was prepared from the same formulation as employed in Example II except that the polyvinyl acetate, and 31.24 parts of water were admixed to form an emulsion which was then added to the solution. The resultant product was quite effective in adhering various plastics to cellulosic and other plastic surfaces. A dried film of the above adhesive composition was redispersible in hot and cold water.

EXAMPLE IV

An adhesive was prepared as set forth in Example III, except that the formulation was as follows:

| | |
|---|---|
| Polyvinyl Acetate | 30.00 |
| Polyvinyl Alcohol | 1.43 |
| Polyvinylpyrrolidone | 7.03 |
| Glycerol | 2.44 |
| Preservative (o-phenylphenol) | .06 |
| Defoamer | .33 |
| Water | 58.71 |
| | 100.00 |

The resultant adhesive was found to be quite useful in arts and crafts work involving plastics. The resultant adhesive when in dried film form was redispersible in cold and hot water more easily than the corresponding adhesive in the Columbus, et al, patent.

EXAMPLE V

Two different washing tests were made on swatches of cloth made of acetate, corduroy, cotton, Dacron, 65% Dacron 35% cotton, silk, wool, and a mixture of wool and acetate which had been saturated with the adhesives of A and B. Adhesive A was the adhesive of Example I. Adhesive B was the same as Adhesive A, except that the polyvinylpyrrolidone was replaced by an equal amount of polyvinyl alcohol.

(a) The first test consisted of dipping a swatch of each of the different cloths with Adhesive A and Adhesive B, pressing the swatches to remove the excess adhesive, and hanging the swatches to dry. After drying for 24 hours at 75° F., the swatches were stiff and were washed in cold and hot water under laboratory conditions simulating a typical washing machine cycle. The cold water wash was accomplished by using Cold Power and the hot water with Ivory Soap. Except for water temperature, the washing procedures were identical. One gram of the detergent or soap was placed into a quart jar with the swatch and the jar filled ¾ full with water; water from the cold water faucet (about 70° F.) for the cold water wash and water at 160° F. to 170° F. for the hot water wash. In addition to the samples washed with detergent or soap, samples were also washed with plain hot tap water at 160° F. to 170° F. as well as "cold" water at 70° F. The quart jars were agitated in a laboratory shaker for 8 minutes (180 shakes per minute; each shake representing a forward and backward motion). The fabrics were then rinsed with hot or cold water depending on the washing procedure used and after being wrung, they were hung to dry. Each dry fabric was then examined for cleanliness and stiffness and compared with its original unsoiled counterparts. The fabrics soiled with Adhesive A were soft and clean. The fabrics soiled with Adhesive B still contained adhesive. They required 15 minutes of washing to remove the adhesive to the point where they were as soft and clean as those which were soiled with Adhesive A after 8 minutes of washing.

(b) The second test was a spot soiling test. The fabrics were soiled with circular spots of Adhesive A and Adhesive B approximately 3 inches in diameter and the adhesive was allowed to dry overnight. The soiled fabrics were then placed on a clean towel and the circles were each given 18 strokes with a towel dipped in hot water (160° F.). Adhesive A was washed off readily. Adhesive B was not washed off and required 25 strokes for removal.

In all of the washing tests above, it was found that the use of soap or detergent did not make a marked difference in respect to the degree of cleaning obtained.

It will be understood that it is intended to cover all changes and modifications of the examples of the invention herein chosen for the purpose of illustration which do not constitute departures from the spirit and scope of the invention.

I claim:

1. A polyvinyl acetate adhesive redispersible in hot and cold water when in dried film form, consisting essentially of an emulsion of a polyvinyl acetate; an anti-coalescing polyvinylpyrrolidone and a nonvolatile, water-soluble plasticizer for said anti-coalescing agent that is immiscible with the polyvinyl acetate resin, said plasticizer being present in amount to impart flexibility to the dried adhesive film and the ratio of polyvinyl acetate to anti-coalescing agent not exceeding from about 8 parts by weight of acetate for each part by weight of polyvinylpyrrolidone.

2. A polyvinyl acetate adhesive redispersible in hot and cold water when in dried film form consisting essentially of an emulsion of a polyvinyl acetate; an anticoalescing polyvinylpyrrolidone which is not copolymerized with polyvinyl acetate; and a nonvolatile, water-soluble plasticizer for said anti-coalescing agent that is immiscible with the polyvinyl acetate resin; said plasticizer being present in amount to impart flexibility to the dried adhesive film and the ratio of polyvinyl acetate to anti-coalescing agent not exceeding from about 8 parts by weight of acetate for each part by weight of polyvinylpyrrolidone.

3. A polyvinyl acetate adhesive redispersible in hot and cold water when in dried film form consisting essentially of an aqueous emulsion of an unhydrolyzed polyvinyl acetate; and anti-coalescing polyvinylpyrrolidone agent which is not copolymerized with polyvinyl acetate; and a non-volatile, water-soluble plasticizer for said anti-coalescing agent that is immiscible with the polyvinyl acetate resin; the plasticizer being selected from the group consisting of glycerol, sorbitol, ethylene glycol, propylene glycol, diethylene glycols and mixtures thereof, said plasticizer being present in amount sufficient to impart flexibility to the dried adhesive film and the ratio of polyvinyl acetate to polyvinylpyrrolidone not exceeding from about 8 parts by weight of acetate for each part by weight of polyvinylpyrrolidone.

4. Adhesive of claim 3 in which the plasticizer is present in amount of at least about 35% and up to 100% by weight of polyvinylpyrrolidone, polyvinyl acetate has a molecular weight of about 30,000 to 60,000, the size of the polyvinyl acetate particles is from about 1 to about 3 microns in diameter, and the ratio by weight of polyvinyl acetate to polyvinylpyrrolidone varies from about 8:1 to 2:1.

5. Adhesive of claim 3 in which there is for each 100 parts by weight of polyvinyl acetate, about 12 to 50 parts by weight polyvinylpyrrolidone and about 20 to 30 parts by weight plasticizer.

6. Adhesive of claim 3 in which there is, for each 100 parts by weight of polyvinyl acetate, about 18 to 25 parts polyvinylpyrrolidone and about 9 to 18 parts plasticizer, the weight average molecular weight of polyvinylpyrrolidone being about 40,000 to 360,000.

7. Adhesive of claim 2 wherein the anti-coalescing polyvinylpyrrolidone is in an admixture with a material selected from polyvinyl alcohol, water soluble cellulose ethers, gums, gelatinized starches, water soluble grades of gelatin and mixtures thereof, the admixture containing at least 20% polyvinylpyrrolidone; relative proportions of ingredients, based on 100 parts by weight of polyvinyl acetate, being from about 12 to 50 parts polyvinylpyrrolidone and about 2 to 30 parts by weight plasticizer.

8. Adhesive of claim 7 where amount of polyvinylpyrrolidone is 18 to 25 parts, amount of plasticizer is 9 to 18 parts and amount of polyvinylpyrrolidone in the admixture is at least 50%.

9. Adhesive of claim 8, wherein weight average molecular weight of polyvinylpyrrolidone is about 40,000 to 360,000 and the plasticizer is selected from the group consisting essentially of glycerol, sorbitol, ethylene glycol, propylene glycol, diethylene glycols and mixtures thereof.

* * * * *